United States Patent [19]

Katoh et al.

[11] Patent Number: 5,011,603
[45] Date of Patent: Apr. 30, 1991

[54] CERAMIC FILTER

[75] Inventors: Yoshihisa Katoh, Toyota; Takashi Ogawa; Mitsumasa Hasegawa, both of Kariya, all of Japan

[73] Assignee: Toshiba Ceramics Co., Ltd., Tokyo, Japan

[21] Appl. No.: 469,712

[22] Filed: Jan. 24, 1990

Related U.S. Application Data

[63] Continuation of Ser. No. 353,156, May 12, 1989, abandoned, and a continuation of Ser. No. 87,352, Aug. 20, 1987, abandoned.

[30] Foreign Application Priority Data

Aug. 20, 1986 [JP] Japan .................. 61-194590

[51] Int. Cl.$^5$ .............. B01D 39/16; C04B 37/00
[52] U.S. Cl. ................ 210/490; 210/497.01; 210/510.1; 55/523
[58] Field of Search ........... 210/435, 489, 490, 497.01, 210/500.1, 510.1; 55/485, 522, 523

[56] References Cited

U.S. PATENT DOCUMENTS

| | | | |
|---|---|---|---|
| 4,264,346 | 4/1981 | Mann | 210/510.1 |
| 4,278,544 | 7/1981 | Takashima | 210/510.1 |
| 4,528,099 | 7/1985 | Rieger et al. | 210/510.1 |
| 4,562,021 | 12/1985 | Alary et al. | 210/500.27 |
| 4,645,596 | 2/1987 | Kuwajima | 210/510.1 |

Primary Examiner—Robert A. Dawson
Assistant Examiner—Wanda L. Millard
Attorney, Agent, or Firm—Wegner, Cantor, Mueller & Player

[57] ABSTRACT

A ceramic filter comprising a support layer having an inner surface for forming at least one filter passage, and a filter layer coated on the inner surface of the support layer and having an inner surface functioning as a filter surface, the filter layer having a thickness of 10 to 40 microns from the filter surface, a cumulative intrusion volume of all pores in the filter layer being 0.2 cc/g or less, a cumulative intrusion volume of pores having pore diameters of 0.1 to 3.0 microns being 0.1 cc/g or more, and a cumulative intrusion volume (H) of the pores ranging within a pore diameter width (W) of 0.1 microns around a center pore diameter (PD) which is a pore diameter in case of a half of a cumulative intrusion volume (IV) at a pore diameter of 0.1 microns being 50% or more of a cumulative intrusion volume of all pores in the filter layer.

3 Claims, 6 Drawing Sheets

CERAMIC FILTER

This application is a continuation of U.S. application Ser. No. 353,156, filed May 12, 1989, now abandoned and Ser. No. 087,352, filed Aug. 20, 1987, now abandoned.

BACKGROUND OF THE INVENTION

This invention relates to an improved ceramic filter for use in ultrafiltration or precision-filtration.

A conventional filter for ultrafiltration or precision-filtration has a separation layer such as a synthetic organic film such as cellulose acetate, PVA and nylon; or a filter cloth coated with a filtration auxiliary such as diatomaceous earth. Such a separation layer is used as a full forced-flow filter.

The synthetic film has a poor strength so that the pressure difference must be 20 kgf or less. It cannot be used for a long time at a temperature of 50° C. or more. It cannot be used for the purpose of filtering an acid solution. Back washing is not effective in case of the conventional forced filtering.

Recently, ceramic filters have been proposed because they have a good strength, heat resistance or chemical resistance and can be easily formed in a pipe shape. Also, as cross-flow filtration is possible, back washing is effective. However the conventional ceramic filters do not have all of the desired strength, filtration rate and accuracy characteristics.

SUMMARY OF THE INVENTION

The object of this invention is to provide a ceramic filter which can easily have all of desired strength, filtration and accuracy characteristics.

According to this invention, a ceramic filter includes a filter layer having a thickness of 10 to 40 micron meters (hereinafter called merely microns) from a filter surface. When it is measured by a mercury porous-meter, the cumulative intrusion volume of all pores in the filter layer is 0.2 cc/g or less. The cumulative intrusion volume of the pores having pore diameters of 0.1 to 3.0 microns is 0.1 cc/g or more. The cumulative intrusion volume (H) of the pores ranging within the pore diameter width (w) of 0.1 microns around a center pore diameter (PD), which is a pore diameter in case of a half (IV/2) of a cumulative intrusion volume (IV) at a pore diameter of 0.1 microns is 50% or more of a cumulative intrusion volume of all pores.

A ceramic filter of this invention has not only a relatively small cumulative intrusion volume of all pores so that an excellent strength can be obtained, but also a relatively large cumulative intrusion volume of pores having a reasonable performance so that the filtration rate is large enough for use in ultrafiltration or precision-filtration. In addition, as a majority of pores range within a pore diameter width (w) of 0.1 microns, filtration is accurate and precise.

If a thickness of the filter layer is less than 10 microns, a high strength can not be obtained, and nonuniformity can not be avoided. If it is more than 40 microns, filtration performance is decreased, and the filter layer is sometimes broken away due to heat expansion.

If the cumulative intrusion volume of all pores is more than 0.2 cc/g, the desired strength can not be easily obtained. If the cumulative intrusion volume of the pores having a pore diameter of 0.1 to 3.0 microns is less than 0.1 cc/g, the filtration rate is decreased.

DESCRIPTION OF THE EXAMPLES

A binder is mixed with alumina powders having a high purity and a particle size of 10 to 30 microns thereby to make a mixture. After this mixture is formed in the shape of a pipe having an outer diameter of 19 mm, an inner diameter of 15 mm and a thickness of 2 mm, such a shaped body is heated in order to remove the binder. Next, a suspension containing a high purity of alumina powders having a particle size of 2 to 10 microns is coated on an inner surface of the shaped body and then dried whereby an intermediate filter layer is formed. Again, a suspension containing a high purity of alumina powders having a particle size of 0.4 to 1 microns is coated on the intermediate filter layer and then dried whereby an inner filter layer is formed on the intermediate filter layer. Finally, the shaped body and the two filter layers are heated at a temperature of 1500° C. so that a pipe-like ceramic filter can be obtained.

The intermediate filter layer having a thickness of 30 microns and the inner filter layer having a thickness of 10 microns function as a filter layer while the pipe-like body having a thickness of 2 mm functions as a support layer.

FIGS. 1 to 5 show relationships between cumulative intrusion volume and pore diameter of each filter layer in the ceramic filter of this invention and other conventional ceramic filters of the comparative examples 1 to 3. The cumulative intrusion volumes are measured by a well-known mercury porous-meter.

Figure 1:
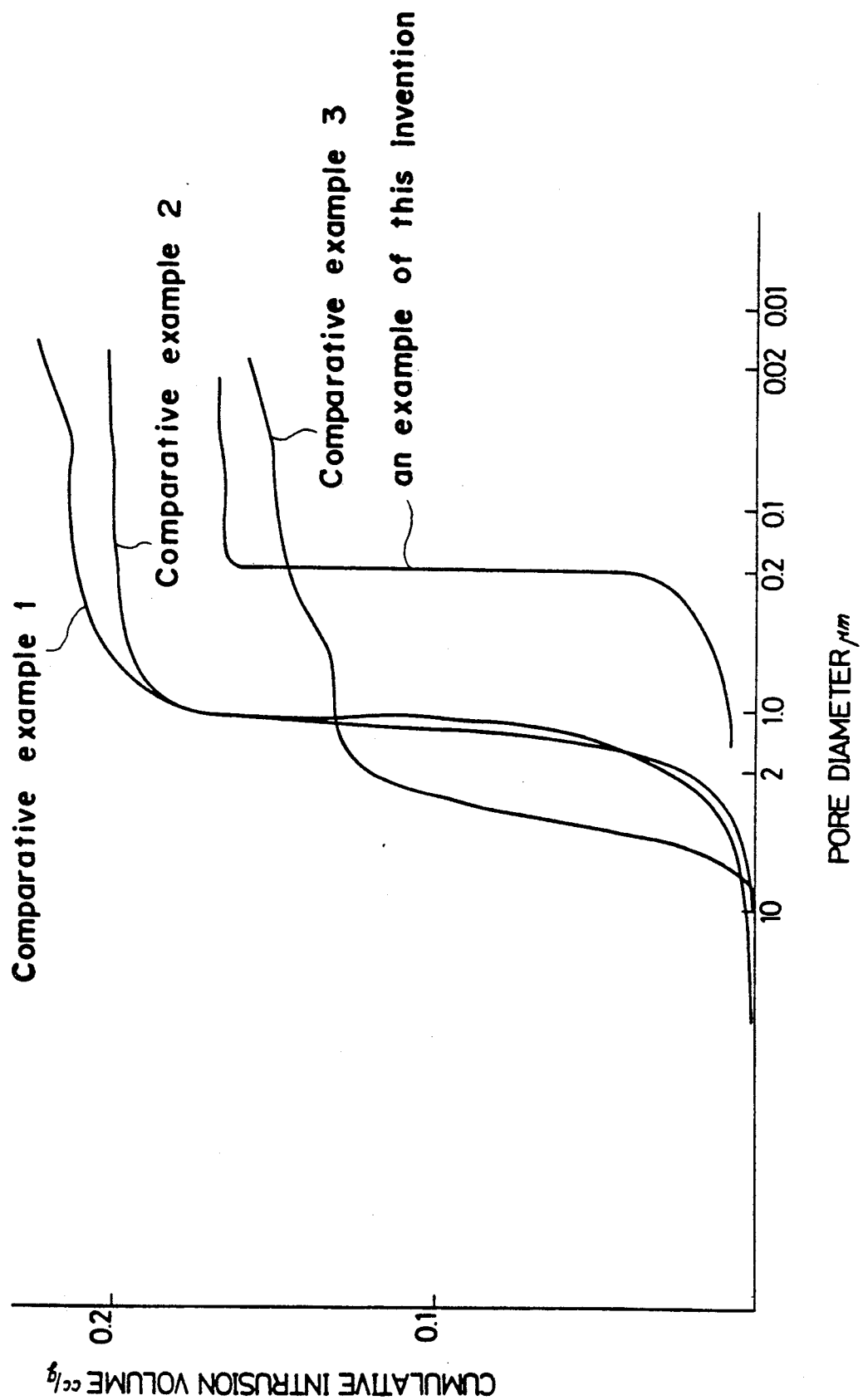
FIG. 1 is a graph showing relationships between pore diameter and cumulative intrusion volume of filter layers according to an example of this invention and three comparative examples.

Table 1 shows the following items of the example of this invention and the comparative examples 1 to 3 shown in FIG. 1:

(a) Cumulative intrusion volume of all pores in each filter layer;

(b) Cumulative intrusion volume of pores having a pore diameter of 0.1 to 0.3 microns; and (c) Percentage of cumulative intrusion volume of pores ranging within a pore diameter width (W) of 0.1 microns around a center pore diameter (PD) which is the pore diameter when the cumulative intrusion volume is a half of the cumulative intrusion volume (IV) at a pore diameter of 0.1 microns.

In FIGS. 1 to 5, the curves showing the pore diameter and cumulative intrusion volume relationships have the largest inclination angle at each center pore diameter where the largest cumulative intrusion volume can be obtained.

Figure 2:
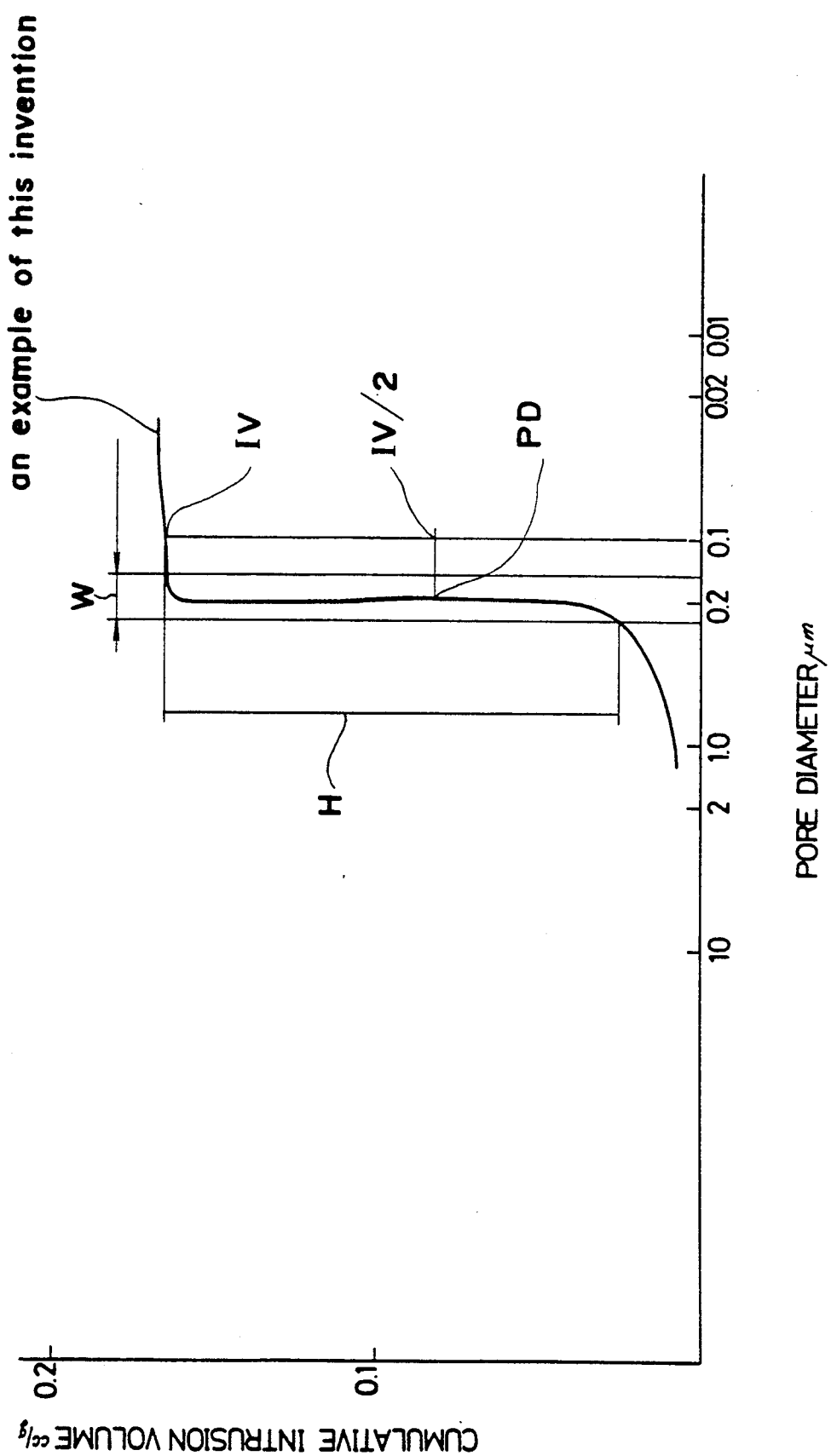
FIGS. 2 to 5 show separately each relationship between pore diameter and cumulative intrusion volume of the examples shown in FIG. 1.

Referring to Table 1 and FIG. 2 showing the example of this invention, the cumulative intrusion volume of all pores is 0.18 cc/g. The cumulative intrusion volume of the pores having a pore diameter of 0.1 to 3.0 microns is 0.17 cc/g. The center pore diameter (PD) is 0.2 microns. The cumulative intrusion volume (H) of the pores ranging within a pore diameter width (W) of 0.1 microns is 0.12 cc/g, the percentage of which is 66.7%. This cumulative intrusion volume (H) is larger than a half (IV/2) of the cumulative intrusion volume (IV) at a pore diameter of 0.1 microns.

Figure 3:
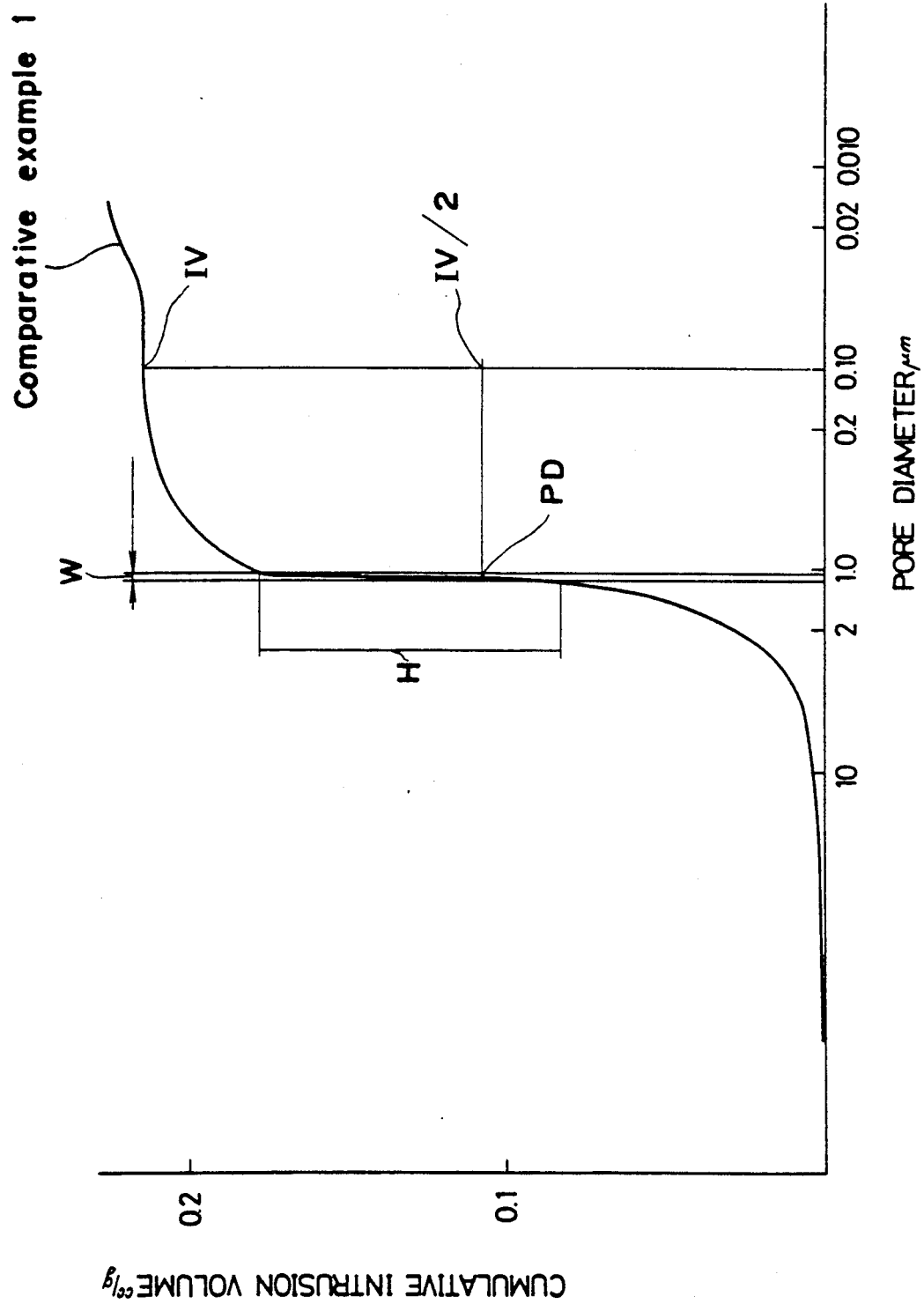

Referring to Table 1 and FIG. 3 showing the comparative example 1, the cumulative intrusion volume of all pores is 0.23 cc/g. The cumulative intrusion volume of the pores having a pore diameter of 0.1 to 3.0 microns is 0.20 cc/g. The center pore diameter (PD) is 1.1 microns. The cumulative intrusion volume (H) of the pores ranging within a pore diameter width (W) of 0.1 microns has a percentage of 42.7%. In other words, this cumulative intrusion volume (H) is smaller than a half (IV/2) of the cumulative intrusion volume (IV) at a pore diameter of 0.1 microns.

Figure 4:
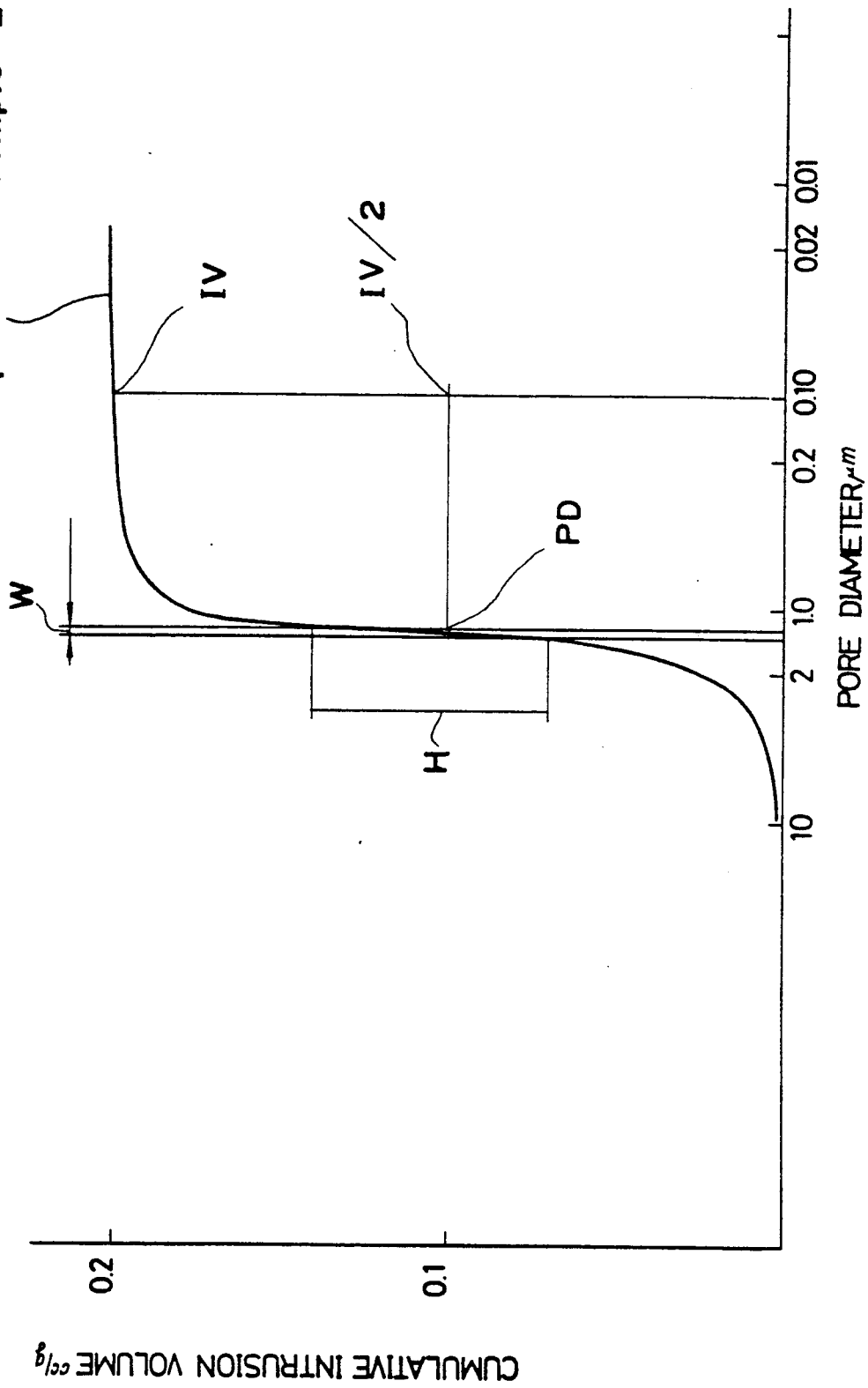

Referring to Table 1 and FIG. 4 showing the comparative example 2, the cumulative intrusion volume of all pores is 0.21 cc/g. The cumulative intrusion volume of the pores having a pore diameter of 0.1 to 3.0 microns is 0.19 cc/g. The center pore diameter (PD) is 1.2 microns. The cumulative intrusion volume (H) of the pores ranging within a pore diameter width (W) of 0.1 microns has a percentage of 20.4%. In other words, this cumulative intrusion volume (H) is smaller than a half (IV/2) of the cumulative intrusion volume (IV) at a pore diameter of 0.1 microns.

Figure 5:
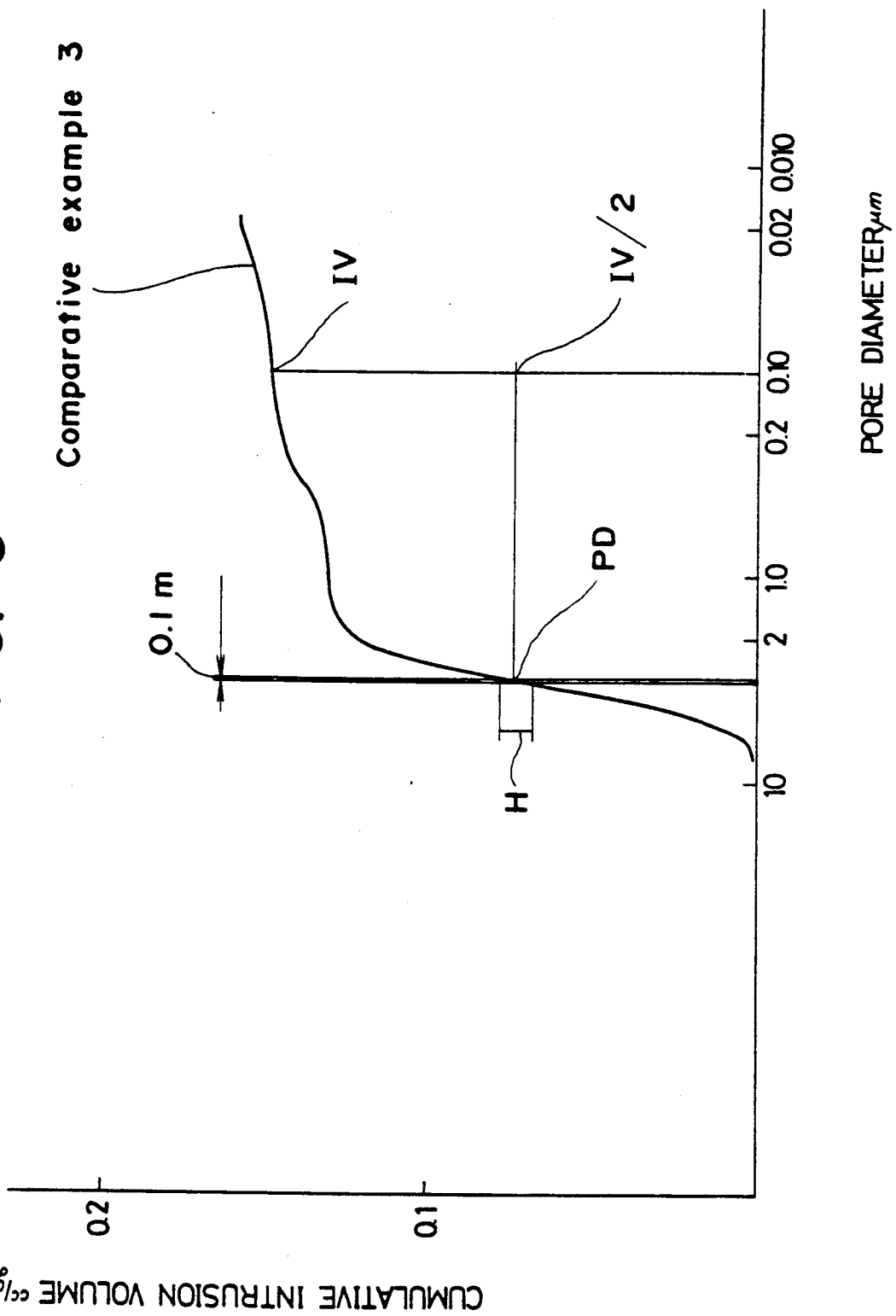

Referring to Table 1 and FIG. 5 showing the comparative example 3, the cumulative intrusion volume of all pores is 0.17 cc/g. The cumulative intrusion volume of the pores having a pore diameter of 0.1 to 3.0 microns is 0.05 cc/g. The center pore diameter (PD) is 3.8 microns. The cumulative intrusion volume (H) of the pores ranging within a pore diameter width (W) of 0.1 microns has a percentage of 3.0%. In other words, this cumulative intrusion volume (H) is smaller than a half (IV/2) of the cumulative intrusion volume (IV) at a pore diameter of 0.1 microns.

Figure 6:
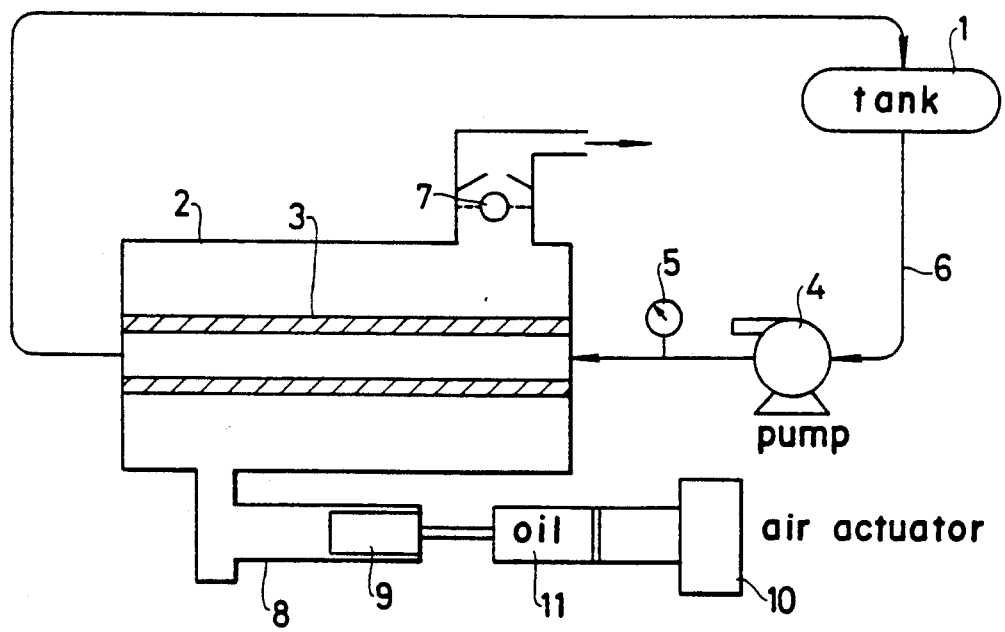
FIG. 6 is a schematic explanation view showing a filter apparatus equipped with a ceramic filter according to an example of this invention.

FIG. 6 shows a filter apparatus equipped with a ceramic filter according to this invention. A tank 1 contains a starting liquid to be filtered. A pipe-like ceramic filter 3 is set in a filter container 2. The tank 1 is connected to the filter container 2 through a line 6 including a pump 4 and a flow meter 5. The starting liquid flows through the ceramic filter 3 in the filter container 2 so as to be filtered. The filtrate is supplied through a float valve 7 to a predermined place out of the filter container 2 while the enriched liquid flows back to the tank 1.

This application incorporates by reference the disclosure of co-pending U.S. application Ser. No. 087,290, filed Aug. 20, 1987, now abandoned, which discloses construction details of a filter unit using a ceramic filter such as that of the present invention, as well as a back wash system for cleaning the filter during use. This application also incorporates by reference the disclosures of copending U.S. applications Ser. No. 087,351, filed Aug. 20, 1987, now U.S. Pat. No. 4,839,488, and Ser. No. 087,357, filed Aug. 20, 1987, now abandoned, which disclose further specific uses for the present ceramic filter to purify a dielectric fluid used in electric discharge engraving and a reaction mixture used in the manufacture of esters, respectively.

The filter container 2 is equipped with a cylinder means 8 in which a piston 9 is arranged so as to be actuated by an air actuator 10. The oil 11 is disposed in a sealed condition between the piston 9 and the air actuator 10. If the air actuator 10 actuates the piston 9, then the ceramic filter 3 is back-washed by the filtered liquid remaining in the filter container 2.

Table 2 and Table 3 show test results of the example of this invention and the three comparative examples 1 to 3 as above-stated each of which is set in the filter apparatus of FIG. 6.

In Table 2, a starting liquid to be filtered is aged mash for sake, a Japanese alcoholic drink. Table 2 shows the number of yeast bacteria and Lactobacillus homohiochii or Lactobacillus heterohiochii (hereinafter called hiochii bacteria) which is a kind of lactic bacteria, contained in the aged mash for sake before filtration, filtration rate when filtered; and the number of yeast bacteria and hiochii bacteria leaked through the ceramic filter 3 after filtered.

In Table 3, the liquid to be filtered is aged mash for soy sauce, a dark brown liquid made from soybeans. Table 3 shows the volume of the aged mash for soy sauce dropped on an agar in a Petri dish before filtration; filtration rate when filtered; and the number of colony and bacteria contained in the soy sauce dropped on an agar in a Petri dish after filtration.

In Table 2 and Table 3, a reference example is a filter having a filter cloth coated with diatomaceous earth. The reference example is tested in the same manner.

Although in the shown embodiment a ceramic filter has only one filter passage, plural filter passages can be formed in a support layer, for example, in parallel to each other.

TABLE 1

|  |  | Cumulative intrusion volume of all pores (cc/g) | Cumulative intrusion volume of pores having a pore diameter of 0.1–3.0 microns (cc/g) | Center pore diameter (microns) | Percentage of cumulative intrusion volume of pores ranging within a pore diameter width of 0.1 microns (%) |
|---|---|---|---|---|---|
| Comparative Examples | 1 | 0.23 | 0.20 | 1.1 | 42.7 |
|  | 2 | 0.21 | 0.19 | 1.2 | 20.4 |
|  | 3 | 0.17 | 0.05 | 3.8 | 3.0 |
| Example of this invention |  | 0.18 | 0.17 | 0.2 | 66.7 |

TABLE 2

|  | Filtration rate (m³/Hm²) | Leakage of yeast (number/ml) | Leakage of hiochii bacteria (number/ml) |
|---|---|---|---|
| liquid to be filtered | — | (580) | (400) |
| Reference example |  | 100 | 100 |
| Comparative example 1 | 0.6 | 95 | 145 |
| Comparative example 2 | 0.5 | 110 | 170 |
| Comparative example 3 | 0.3 | 250 | 350 |
| Example of this invention | 1.0 | 0 | 55 |

TABLE 3

|  | Filtration rate ($m^3/Hm^2$) | Liquid per one plate (l) | The number of colony | The number of bacteria per 1 ml |
| --- | --- | --- | --- | --- |
| liquid to be filtered | — | 20 | 35 | 37000 |
|  |  | 50 | 51 | 21000 |
|  |  | 100 | 135 | 28000 |
| Reference example | 3.0 | 20 | 29 | 1200 |
|  |  | 50 | 58 | 1500 |
|  |  | 100 | 121 | 1600 |
| Comparative example 1 | 0.4 | 20 | 25 | 17000 |
|  |  | 50 | 50 | 12000 |
|  |  | 100 | 128 | 12000 |
| Comparative example 2 | 0.3 | 20 | 30 | 15000 |
|  |  | 50 | 55 | 12000 |
|  |  | 100 | 132 | 13000 |
| Comparative example 3 | 0.1 | 20 | 32 | 32000 |
|  |  | 50 | 63 | 20000 |
|  |  | 100 | 145 | 25000 |
| Example of this invention | 0.8 | 20 | 0 | less than 10 |
|  |  | 50 | 0 | less than 10 |
|  |  | 100 | 0 | less than 10 |

We claim:

1. A ceramic filter comprising a support layer having an inner surface for forming at least one filter passage and a filter layer on the inner surface of the support layer and having an inner surface functioning as a filter surface, the filter layer having a thickness of 10 to 40 microns from the support layer and comprising an intermediate layer coated on the inner surface of the support layer and an inner layer coated on the intermediate layer, the intermediate layer being made of alumina powder having a particle size of 2 to 10 microns and the inner layer being made of alumina powder having a particle size of 0.4 to 1 microns, wherein all pores in the filter layer have a cumulative intrusion volume of 0.2 cc/g or less, pores having pore diameters of 0.1 to 3.0 microns have a cumulative intrusion volume of 0.1 cc/g or more, and pores ranging within a pore diameter width (W) of 0.1 microns around a center pore diameter (PD) have a cumulative intrusion volume (IV) which is 50% or more of the cumulative intrusion volume of all pores in the filter layer, and wherein the support layer, intermediate layer and inner layer are heated together at a temperature sufficient to obtain the ceramic filter.

2. The ceramic filter of claim 1, wherein the filter layer is made of an alumina ceramic material having a high purity.

3. The ceramic filter of claim 1, wherein the filter is formed in the shape of a pipe.

* * * * *